April 18, 1967

R. J. BELL 3,314,560

CAPSULE UNLOADER

Filed July 19, 1965

FIG_1

INVENTOR
RAYMOND J. BELL

BY Hans G. Hofmeister
ATTORNEY

April 18, 1967 R. J. BELL 3,314,560
CAPSULE UNLOADER
Filed July 19, 1965 9 Sheets-Sheet 2

INVENTOR
RAYMOND J. BELL
BY *Hans F. Hoffmeister*
ATTORNEY

United States Patent Office 3,314,560
Patented Apr. 18, 1967

3,314,560
CAPSULE UNLOADER
Raymond J. Bell, San Jose, Calif., assignor to FMC Corporation, San Jose, Calif., a corporation of Delaware
Filed July 19, 1965, Ser. No. 472,976
13 Claims. (Cl. 214—304)

The present invention pertains to an apparatus for unloading articles such as glass jars from encapsulation within a two-piece telescoping capsule.

When handling articles such as glass jars in heat treatment apparatus, a certain amount of breakage always occurs due to defective jars aggravated by mechanical or thermal shock. Although this breakage may be relatively minor, when jars are handled in well-known reel and spiral heat treatment apparatus, broken jars will build up on the floor of the apparatus and will interfere with unbroken jars moving through the apparatus thereby incurring still greater breakage.

In order to overcome the above disadvantages of handling glass jars in reel and spiral cookers, it has been conceived that the jars be individually confined or encapsulated in telescoping capsules, and remain confined in the capsules until after the jars, broken or intact, have been removed from the heat treatment apparatus. The broad concept of encapsulating containers for movement through heat treatment apparatus and for removing the containers from encapsulation after they have been moved through the heat treatment apparatus has been described and claimed in an application of Allison E. Pech for United States Letters Patent filed on even date herewith and having Ser. No. 473,107. The claims of the present application are limited to the specific apparatus for unloading the containers from encapsulation. The heat treatment apparatus through which the capsules are moved may be of the type disclosed in United States Letters Patent No. 2,536,115 which issued to P. C. Wilbur on Jan. 2, 1951.

Accordingly, it is one object of the present invention to provide an apparatus for unloading articles from encapsulation within a two-piece telescoping capsule.

Another object is to provide a continuous capsule unloader which utilizes magnetic means for separating the carrier from the cartridge and for thereafter separating the cartridge from the article.

Another object is to provide a continuous capsule unloader which simultaneously grips and moves the cartridge and carrier away from the article and thereafter separately discharges the article, the carrier, and the cartridge.

These and other objects and advantages of the present invention will become apparent from the following description and the accompanying drawings, in which:

FIGURE 8 is a diagrammatic perspective illustrating the drive for the capsule twister and capsule unloader of FIGURE 4.

Figure 1:
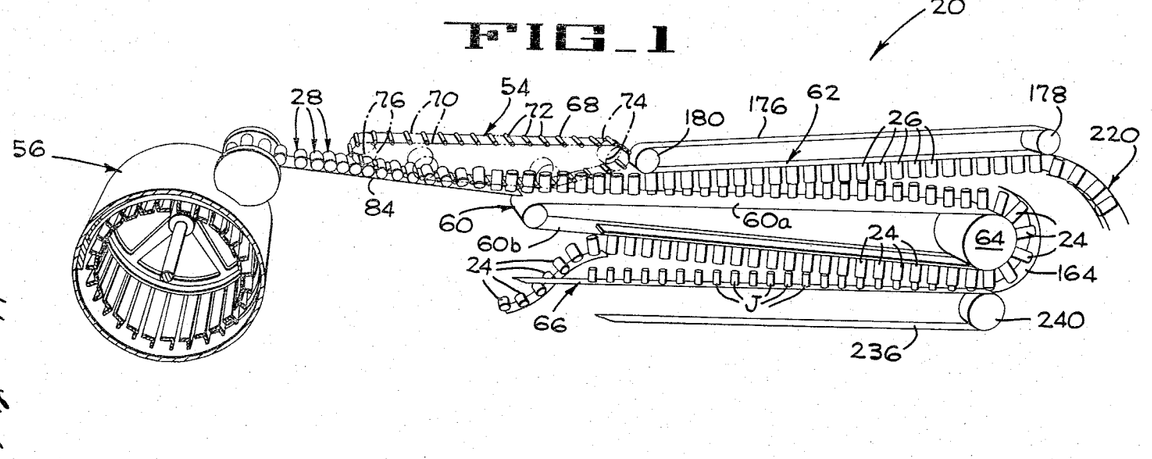
FIGURE 1 is a diagrammatic perspective of a capsule twister and a capsule unloader shown associated with a heat treatment apparatus.
Figures 2, 3:
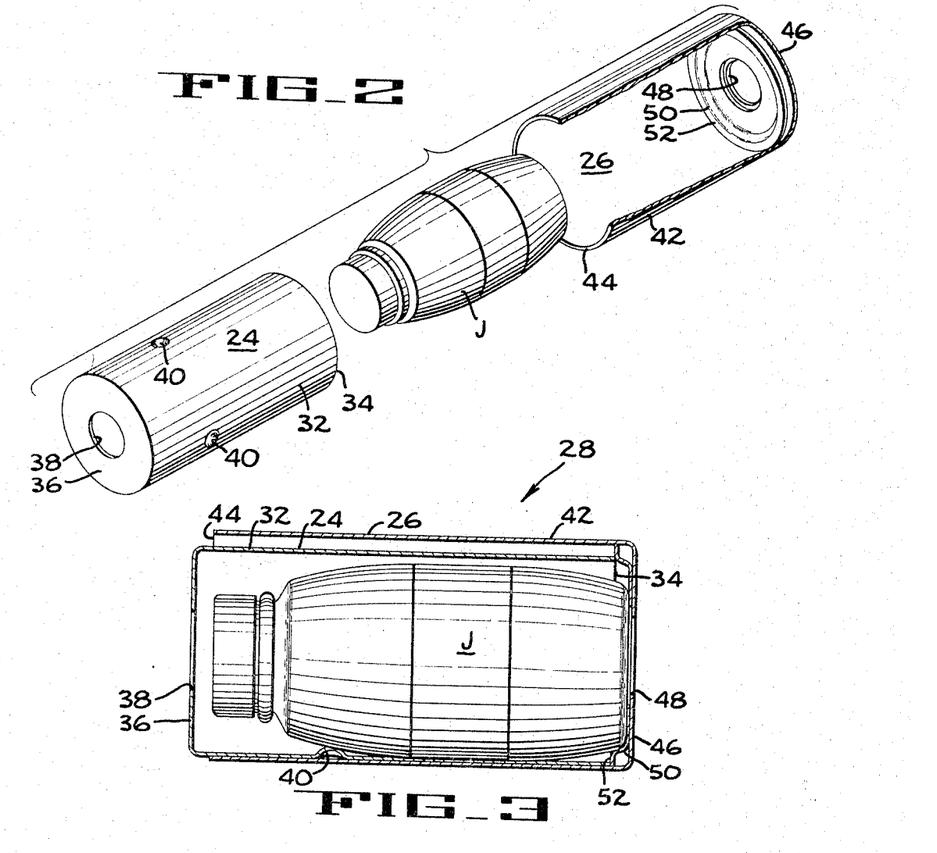
FIGURE 2 is an enlarged, exploded perspective illustrating the position of a jar relative to a cartridge and carrier prior to being encapsulated within the cartridge and carrier.
FIGURE 3 is a vertical central section through a telescoping capsule formed by the cartridge and carrier illustrating the manner in which a jar is confined therein.

The capsule unloader 20 (FIG. 1) of the present invention is provided for unloading articles such as jars J from encapsulation within telescoping cartridges 24 and carriers 26 of ferrous material which cooperate to define capsules 28. As illustrated in FIGURES 2 and 3, each cartridge 24 includes a cylindrical body 32 which is slightly larger in diameter than the jars J being processed, and has one open end 34 through which the associated jar is inserted. The other end of the cartridge 24 is partially closed by an end plate 36 which is formed integrally with the body 32 and has an opening 38 therein to permit the heat treatment medium to enter the capsule 28. Dimples 40 are formed in the cylindrical body 32 near the end plate 36 and engage the jar J to serve as a stop which prevents the cap of the jar from contacting the end plate 36. If such contact was permitted, lithography on the jar caps could be damaged by engagement with the end plate 36.

The carrier 26 of each capsule 28 is similar in appearance to the cartridge 24 and includes a cylindrical body 42 of slightly greater diameter than the body 32. The body 42 has an open end 44, which telescopically receives the cartridge 24 and a partially closed end defined by a plate 46 integral with the body 42 and having an opening 48 therein. In order to minimize magnetic attraction between the open end 34 of the cartridge 24 and the end plate 46 of the carrier 26 when the end plate 46 is subjected to a magnetic force, an apertured dish 50 of non-magnetic material is rigidly secured to the inside surface of the end plate 46 and includes an annular flange 52 spaced from the end plate 46 which substantially eliminates any magnetic force attempting to pull the carrier 26 and cartridge 24 toward each other.

Figures 4, 4A, 6:
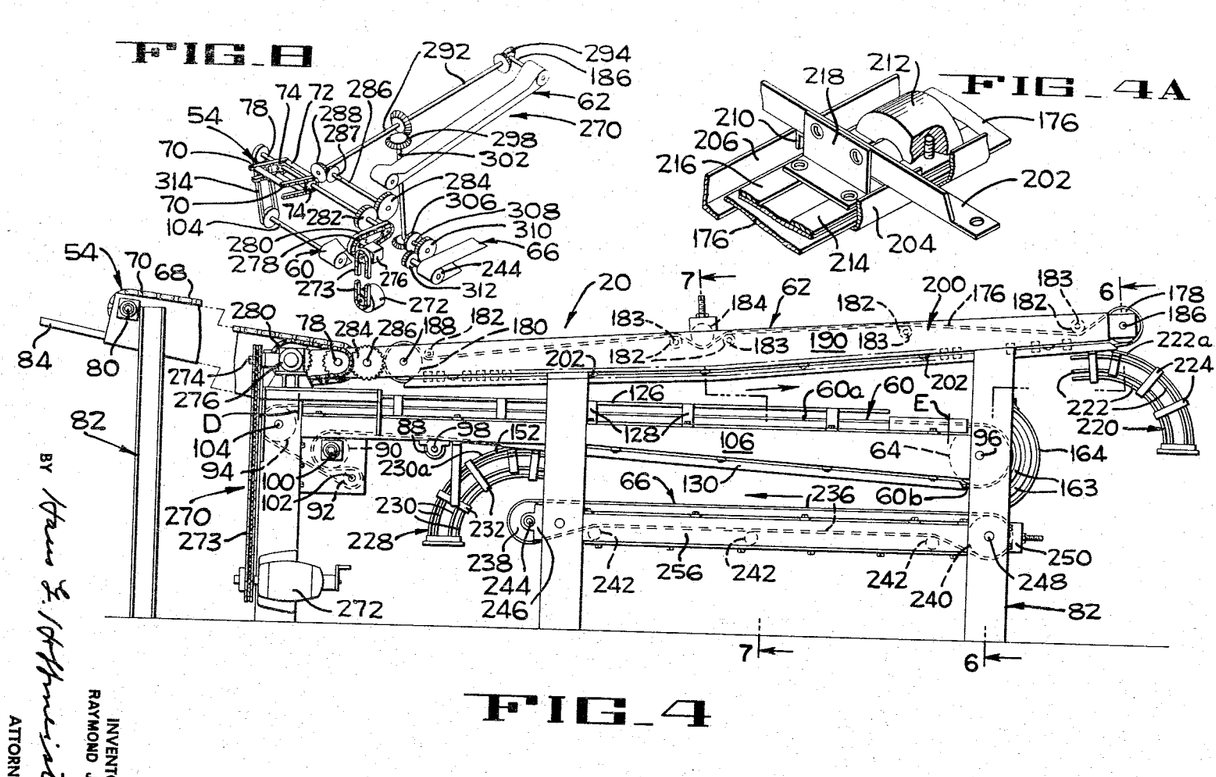
FIGURE 4 is a side elevation of the capsule unloader of FIGURE 1, certain parts being broken away.
FIGURE 4A is a perspective showing the structure for mounting certain magnets used in the capsule unloader.
FIGURE 6 is an enlarged vertical section taken along lines 6—6 of FIGURE 4.
Figure 5:
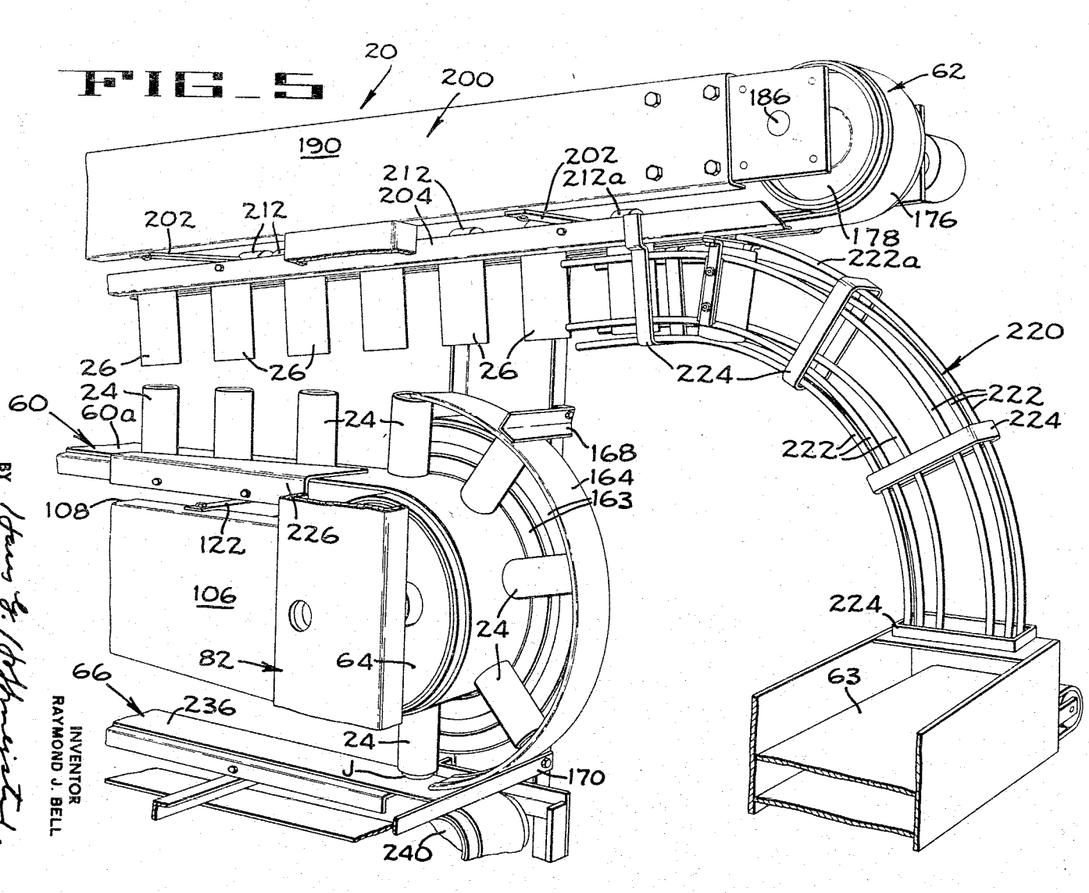
FIGURE 5 is an enlarged perspective, with parts broken away, of the carrier discharge end of the capsule unloader.
Figure 6:
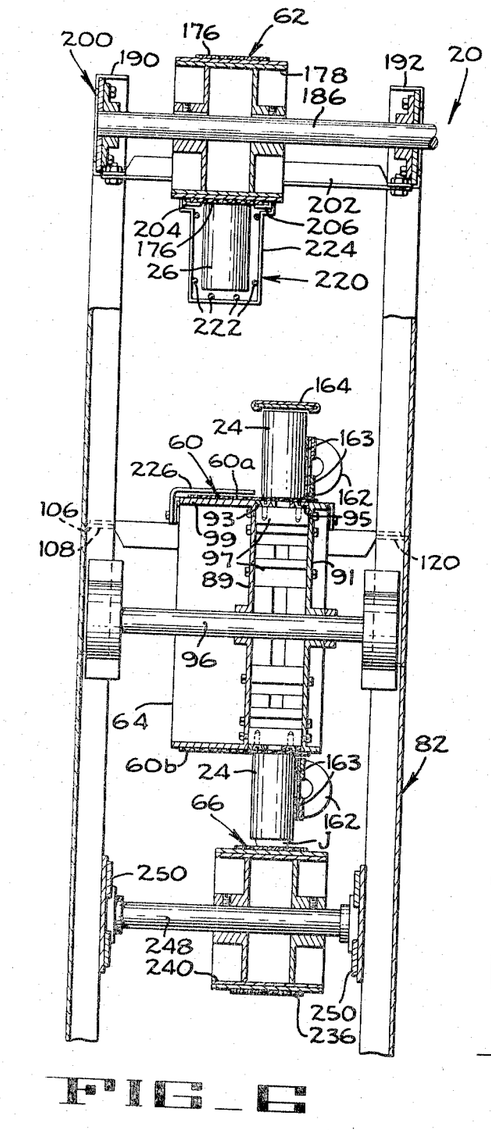

In general, the capsule unloader 20 (FIGS. 1 and 4–8) includes a capsule twister 54 which receives capsules 28 from a heat treatment apparatus such as an atmospheric cooler 56 (FIG. 1) with their longitudinal axes disposed horizontally. The twister 54 turns the capsules through 90° so as to move the capsules 28 to an upright position on the upper run 60a of a cartridge conveyor 60 with the carriers 26 uppermost. The carriers 26 are then magnetically attracted to an upwardly inclined overhead carrier conveyor 62 and are withdrawn from the associated cartridges 24 before being discharged onto a carrier return conveyor 63 (FIG. 5). The cartridges 24 with the processed jars J therein are then conveyed around the magnetic drum 64 (FIGS. 5 and 6) permitting the jars J to gravitate onto the upper run of a jar conveyor 66. The cartridges 24 are magnetically held against the lower run 60b of the cartridge conveyor 60 and are gradually lifted upwardly away from the jars. After the cartridges 24 have been lifted clear of the jars, the cartridges are discharged from the unloader 20 onto any suitable conveying means such as a cartridge return conveyor (not shown). The processed jars are likewise discharged from the jar conveyor 66 onto any suitable discharge means such as a takeaway conveyor or the like (not shown).

The twister 54 includes a twister conveyor 68 (FIGS. 1 and 4) which comprises a pair of endless conveyor chains 70 having a plurality of evenly spaced transverse rollers 72 journalled thereon. The chains 70 are trained around two drive sprockets 74 and around driven sprockets 76 keyed to shafts 78 and 80, respectively, journalled in the frame 82 of the unloader. The conveyor 68 is continuously driven, causing capsules 28 supported on an inclined gravity ramp 84 to enter between adjacent rollers 72 and to positively advance along the ramp 84 which is twisted thereby causing the capsules 28 to assume an upright position on the cartridge conveyor 60 with the carrier 26 uppermost.

The capsule twister 54 is described in more detail and is claimed in an application of Milton L. Croall for United States Letters Patent filed on even date herewith and having Ser. No. 472,975. If a more detailed description of the twister 54 is required, reference may be had to the Croall application which is incorporated by reference herein.

Figure 7:
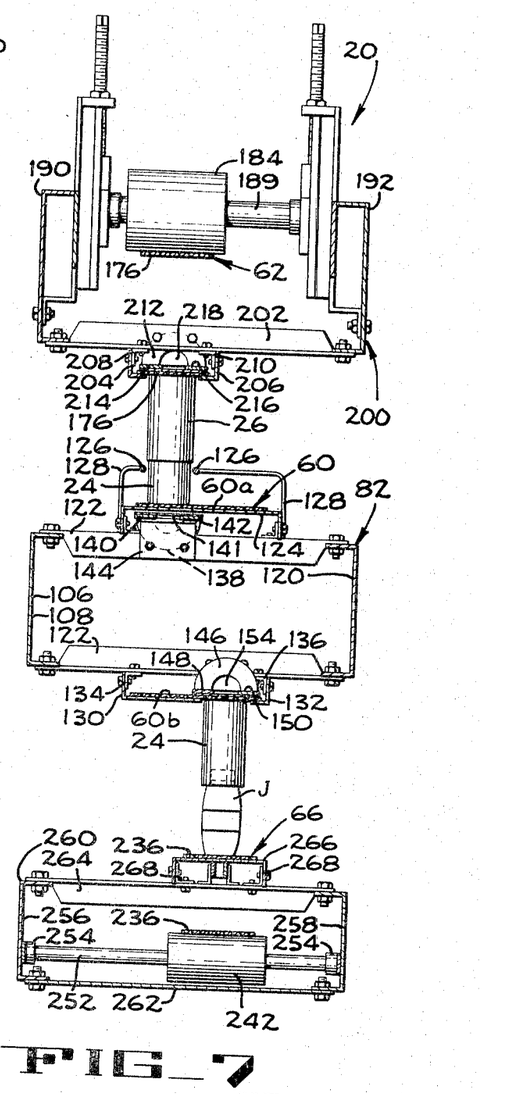
FIGURE 7 is an enlarged vertical section taken along lines 7—7 of FIGURE 4.
Figure 9:
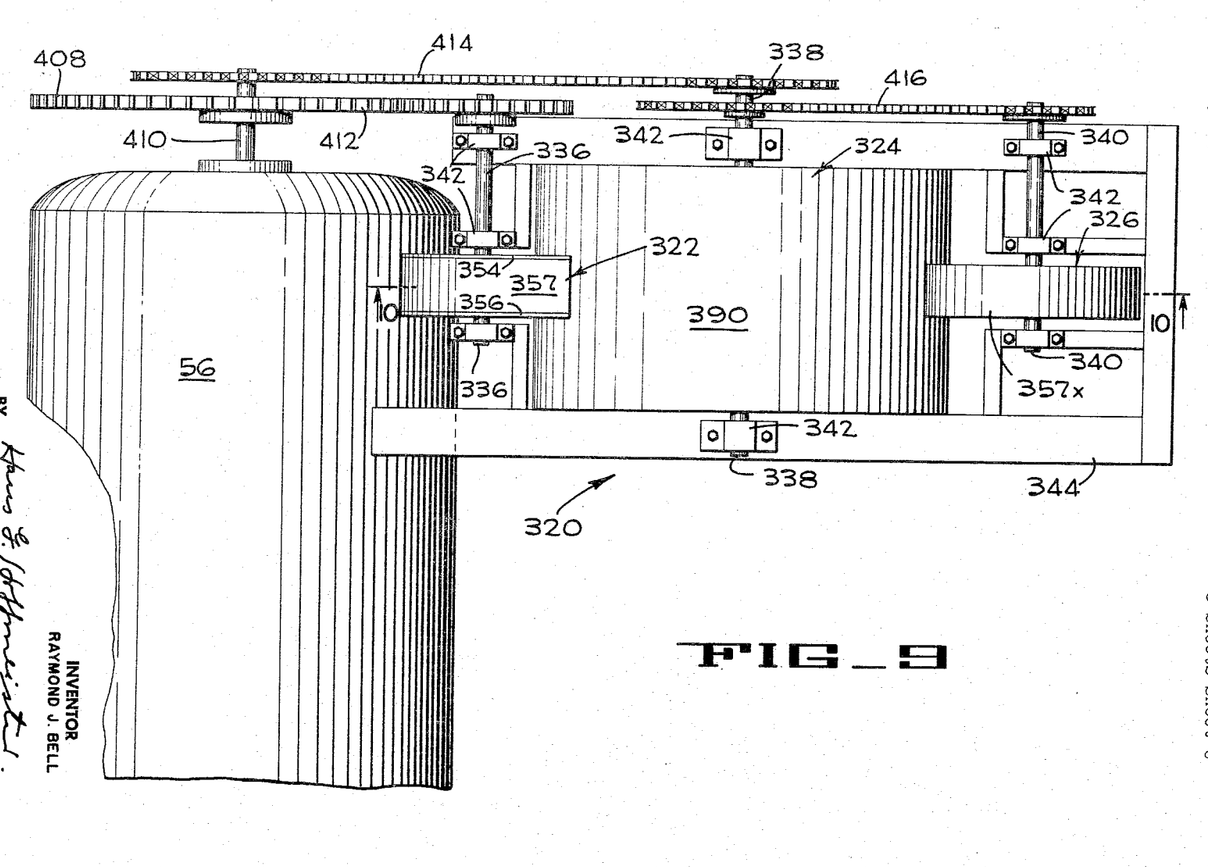
FIGURE 9 is a plan of a second embodiment of a capsule unloader shown associated with a heat treatment apparatus.

The continuously driven cartridge conveyor 60 comprises an endless non-magnetic belt that is trained over the magnetic drum 64 (FIG. 5) and over guide rollers 88, 90, 92 and 94 keyed to shafts 96, 98, 100, 102 and 104, respectively which shafts are journalled in the frame 82 of the capsule unloader 20. The drum 64 may be of the type disclosed in the patent to Cmiel No. 3,120,891 and in general comprises a pair of non-magetic discs 89 and 91 which have hubs keyed to the shaft 96. A pair of pole strips 93 and 95 of magnetic material are disposed near the outer periphery of the discs 89 and 91, respectively, and are bolted to bar magnets 97 which are in turn bolted to the discs 89 and 91. A cylindrical flange 99 is formed integrally on the outer periphery of the disc 89 and is of the same outside diameter as the pole strips 93 and 95. The magnets are oriented so that the north poles are all connected to the strip 93 and the south poles are all connected to the strip 95. Magnetic drums of this type are marketed by the Eriez Manufacturing Co. of Erie, Pa. The upper run 60a and the lower runs 60b of the cartridge conveyor 60 are supported by an elongated sub-frame 106 (FIG. 4) which includes a pair of spaced channel members 108 and 120 (FIG. 7) that have a plurality of spaced transverse upper and lower angle straps 122 bolted thereto. A longitudinally extending, inverted channel shaped belt guide 124 is secured to the upper straps 122 to support the upper run 60a and, elongated capsule guide rails 126 are secured to brackets 128 bolted to the belt guide 124. Spaced belt supporting bars 130 and 132 slidably support the lower run 60b of the conveyor 60 as best illustrated in FIGURE 7. The belt supporting bars 130 and 132 are bolted to angle clips 134 and 136 which are, in turn, bolted to the lower transverse angle straps 122.

A plurality of stabilizing permanent magnets 138 (only one being shown in FIGURE 7) are disposed below a portion of the downstream end of the upper run 60a of the conveyor 60 and serve to magnetically attract the cartridges 24 and pull them down to the upper run 60a of the belt to stabilize the cartridges after the carriers 26 have been withdrawn therefrom. The common poles of the magents 138 are bolted to flat magnetic rails 140 and 142, which extend from point D (FIG. 4) to point E, and the belt guide 124 which supports the belt is secured to brackets 144 which are bolted to the upper angle straps 122. As seen in FIGURE 7, each magnet 138 is a horseshoe magnet, and they are so oriented that the rails 140 and 142 constitute north and south poles, respectively. If desired, a non-magnetic wear strip 141 may be connected across the rails.

Similarly, a plurality of cartridge lifting magnets 146 are secured to magnetic rails 148 and 150 which extend from the magnetic drum 64 (FIG. 4) to a cartridge discharge point 152 at the discharge end of the lower run 60b of the cartridge conveyor 60. The magnetic rails 148 and 150 are secured to brackets 154 which are bolted to the lower angle straps 122.

In order to maintain control of the cartridge 24 and jars J as they move around the drum 64 in a clockwise direction (FIG. 4), a plurality of equally spaced horseshoe magnets 162 are secured to arcuate magnetic rails 163 (FIGS. 5 and 6) which are suitably secured to the frame 82 of the capsule unloader 20 and engage the side surfaces of the cartridges 24 to further stabilize the cartridges as they move around the drum 64. A semicylindrical guide rail 164 (FIG. 5) is disposed around the drum in position to hold the jars within their cartridges 24 and to guide them onto the jar conveyor 66. The guide rail 164 has angle brackets 168 and 170 welded thereto, which brackets are bolted to the frame 82 of the capsule unloader 20.

The continuously driven carrier conveyor 62 comprises an endless non-magnetic belt 176 (FIG. 7) that is trained around a drive roller 178, around an idler roller 180, around five idler rollers 182 and around a take-up roller 184. The rollers 178 and 180 are keyed to shafts 186 and 188, respectively. The idler rollers 182 are keyed to other shafts 183, and the take-up roller 184 is keyed to a shaft 189. The shafts of conveyor 62 are journalled in bearings that are bolted to elongated upwardly inclined channel members 190 and 192 (FIG. 7) of a carrier conveyor sub-frame 200. The channel members are welded to the main frame 82, and the lower surfaces of the channel members are interconnected at spaced intervals by angle brackets 202. A pair of elongated angle belt guides 204 and 206 are bolted to angle clips 208 and 210 (FIG. 7) which are in turn bolted to the angle brackets 202. A plurality of carrier magnets 212 have their common poles secured to magnetic rails 214 and 216 (FIG. 4A) and the rails are secured to the angle brackets 202 by brackets 218. FIGURE 4A discloses a typical mounting for all of the horseshoe magnets used in the machine.

As the capsules 28 move along the cartridge conveyor 60 under the carrier conveyor 62, the carrier magnets 212, some of which are shown in dotted lines in FIGURE 4, magnetically attract the carriers 26 and gradually lift the carriers free from the cartridges 24. As the carriers approach the discharge end of the carrier conveyor 62, the spacing of the magnets 212 is increased thereby reducing the magnetic force attracting the carriers.

A discharge chute 220 comprises six curved rods 222 which are welded to several generally rectangular frame members 224 and slidably engage the ends and sides of the carriers 26. The upper end of the chute 220 is bolted to the belt guides 204 and 206 and is positioned to receive the carriers 26. The uppermost curved rod 222a is shorter than the other rods 222, and the last magnet 212a (FIG. 5), as well as the associated magnetic rails, are positioned so that the carriers 26 will be completely released from the conveyor 62 at a point between the forward end of the rods 222 and the forward end of the upper rod 222a. The chute 220 then guides the freed carriers 26 onto the carrier return conveyor 63 (FIG. 5) which removes the carriers from the capsule unloader 20.

As best illustrated in FIGURES 5 and 6, as the cartridges 24 and jars J travelling along conveyor run 60a approach the magnetic drum 64, they are deflected by a cam plate 226 to the right (FIG. 6) of the vertical plane of movement of the carriers 26 which are supported by the carrier conveyor 62. Thus, the normal path of the cartridge 24 is not directly under the path of the carrier 26 but is to one side thereof and, therefore, if a cartridge 24 becomes wedged in the associated carrier and projects downwardly therefrom, the defective carrier and cartridge will not be carried over the guide rail 164 around the drum 64 but will be advanced past the side of the guide rail 164 before it is dropped from the carrier conveyor 62. Therefore, when the wedged cartridge is released from the carrier, it will not drop on the rail 164 or into the path of movement of cartridges 24 and jars moving along the cartridge conveyor 60.

After the cartridges 24 and jars J move around the magnetic drum 64, the jars are received on the jar conveyor 66 and the cartridges 24 are magnetically attracted to the lower run 60b of the cartridge conveyor 60 as previously described. The cartridges 24 are advanced by the cartridge conveyor 60 to the cartridge discharge point 152 (FIG. 4) at which point the magnetic attraction terminates and the cartridges are released into a cartridge chute 228 which comprises a plurality of curved rods 230 that are welded to and are held in spaced relation by rectangular frame members 232. The chute 228 is bolted to the sub-frame 106 with its upper end disposed in position to receive the empty cartridges 24 from the cartridge conveyor 60. The forward end of the uppermost rod 230a terminates downstream of the ends of the other rods 230 so that the upper side of the chute is open and the cartridges may freely drop into the chute 228, upon loss of magnetic attraction, and be guided by the chute onto a cartridge return conveyor (not shown).

The processed jars J are received on the jar conveyor 66 (FIG. 4) which comprises an endless belt 236 that is trained around a drive roller 238, a driven roller 240 and around idler rollers 242. The drive roller 238 is keyed to a shaft 244 journalled in bearings 246 secured to the frame 82 of the capsule unloader 20. The driven roller 240 is keyed to a shaft 248 journalled in bearings of a take-up device 250 that is secured to the frame 82 in the usual manner. The idler rollers are keyed to shafts 252 (FIG. 7) journalled in bearings 254 secured to channel members 256 and 258 of a sub-frame 260.

A plurality of straps 262 are secured to the lower edges of the channel members 256 and 258, and a plurality of angle brackets 264 are secured to the upper edges of the channel members. As best shown in FIGURE 7, an inverted channel belt guide 266 is secured to the angle brackets 264 by angle clips 268 and cooperating cap screws. The processed jars are conveyed off the discharge end of the jar conveyor 66 onto any suitable collecting means such as a take-away conveyor (not shown).

The drive train 270 (FIGS. 4 and 8) for the capsule unloader 20 receives power from a variable speed motor 272 which is connected by a chain drive 273 to the drive shaft 274 of a right-angle gear box 276. The output shaft 278 of the gear box 276 is connected by a chain drive 280 to the twister conveyor drive shaft 78 which is suitably journalled on the frame 82 of the capsule unloader 20. A drive gear 282, keyed on the twister conveyor drive shaft 78, meshes with a driven gear 284 keyed on a shaft 286 journalled on the frame of the unloader. The shaft 286 is coupled to the drive shaft 287 of the right angle gear unit 288 which has its output shaft coupled to a multi-sectioned drive shaft 292 which extends longitudinally of the unloader 20. The drive shaft 292 is coupled to the input end of a right angle gear unit 294 which has its output shaft coupled to the drive shaft 186 of the carrier conveyor 62 thereby driving the conveyor 62 in the direction of the arrows in FIGURE 4.

An intermediate right angle gear unit 298 is coupled to the shaft 292 and has its output shaft coupled to a vertical shaft 302 which is coupled to a right angle gear unit 306. The output shaft of the gear unit 306 is coupled to a gear shaft 308 that is journalled on the frame 82 of the unloader 20. A drive gear 310 keyed on the shaft 308 meshes with a driven gear 312 keyed on the drive shaft 244 of the jar conveyor 66 and drives the same in the direction indicated by arrows in FIGURE 4.

The cartridge conveyor 60 is driven in the direction of the arrows in FIGURE 4 by a belt drive 314 (FIG. 8) connected between the twister drive shaft 78 and the drive shaft 104 of the conveyor 60.

Although the operation of the apparatus of the present invention has been included with the description of the several components, a brief resume of the operation will follow.

After the capsules 28 have been processed and have been discharged from the atmospheric cooler 56 (FIG. 1), the capsules are advanced through the twister 54 by the twister conveyor 68 thereby shifting the longitudinal axes of the capsule 28 from a horizontal to a vertical position. The capsules 28 are then advanced by the upper run 60a of the cartridge conveyor 60 and become positioned below the carrier conveyor 62. The carriers 26 are then magnetically attracted to the carrier conveyor, and are withdrawn from the cartridges 24 for subsequent discharge through the chute 220 onto the carrier return conveyor 63 (FIG. 5). The cartridges 24 and jar J therein are advanced around the magnetic drum 64 and the jars are deposited on the jar conveyor 66. The cartridges 24 are magnetically attracted to the upwardly inclined lower run 60b of the cartridge conveyor 60 and are withdrawn from the conveyor 60 through the cartridge chute 228 (FIG. 4) onto a cartridge return conveyor (not shown). The processed jars J are discharged from the jar conveyor 66 onto any suitable collecting means such as a take-away conveyor (not shown).

A second embodiment of the capsule unloader 320 is disclosed in FIGURES 9 to 12. In general, the capsule unloader 320 comprises the capsule transfer turret 322 which receives processed capsules 28 from the atmospheric cooler 56 and transfers them to the transverse center of a separating turret 324. The separating turret 324 pulls the cartridges 24 and carriers 26 away from the processed jars J allowing the jars to be discharged through an opening 325 from the separating turret with the aid of a jar transfer turret 326 and curved jar guides 327. After moving past the jar transfer turret, the carriers 26 are moved to the transverse center of the separating turret 324 and are discharged from the turret 324 at a carrier discharge opening 328 with the aid of curved guides 330. After moving past the carrier discharge opening 328, the cartridges 24 are moved to the transverse center of the turret 324 and are discharged from the separating turret 324 through cartridge discharge opening 332 and curved guides 334. The cartridges 24, carriers 26 and processed jars J are then advanced to other machinery by any suitable conveying means (not shown).

More particularly, the turrets 322, 324 and 326 are mounted on shafts 336, 338 and 340, respectively, which shafts are journalled in bearings 342 bolted to a common frame 344. The turret 322 comprises a wheel 346 secured to the shaft 336 and having a plurality of evenly spaced pockets 350 formed on the outer surface thereof, with each pocket being arranged to receive a capsule 28 as it is discharged from the atmospheric cooler 56. The turret 322 is of sufficient width to accommodate the capsules 28 at equally spaced intervals and to transfer the capsules over a curved track 352 from the atmospheric cooler 56 to the separating turret 324. The forward end of the track 352 may be forked and received in slots (not shown) formed in the upstanding walls 353 of the carrier bars 353a of the heat treatment apparatus 56. Stationary walls 354 and 356 are secured to the frame 344 at opposite sides of the transfer turret 322 so as to prevent displacement of the capsules 28 axially of the capsule transfer turret 324, and a curved cover 357 is provided to cover the upper portion of the wheel 346.

The jar transfer turret 326 is substantially the same as the capsule transfer turret 322 and, accordingly, parts of the turret 326 will not be described in detail but will be assigned the same numerals as used to describe equivalent parts of the turret 322 followed by the letter "X."

The capsule separating turret 324 (FIGS. 10, 11 and 12) comprises a reel 358 which includes a pair of spaced wheels 360 and 362 keyed to the shaft 338 and having a plurality of an equally spaced carriage supporting rods 364 secured thereto and extending therebetween. A cylindrical capsule supporting drum 366 is concentric with the shaft 338 and is secured to the wheels 360 and 362 to provide a support for the capsules as they move around the upper half of the turret 324.

Figure 10:
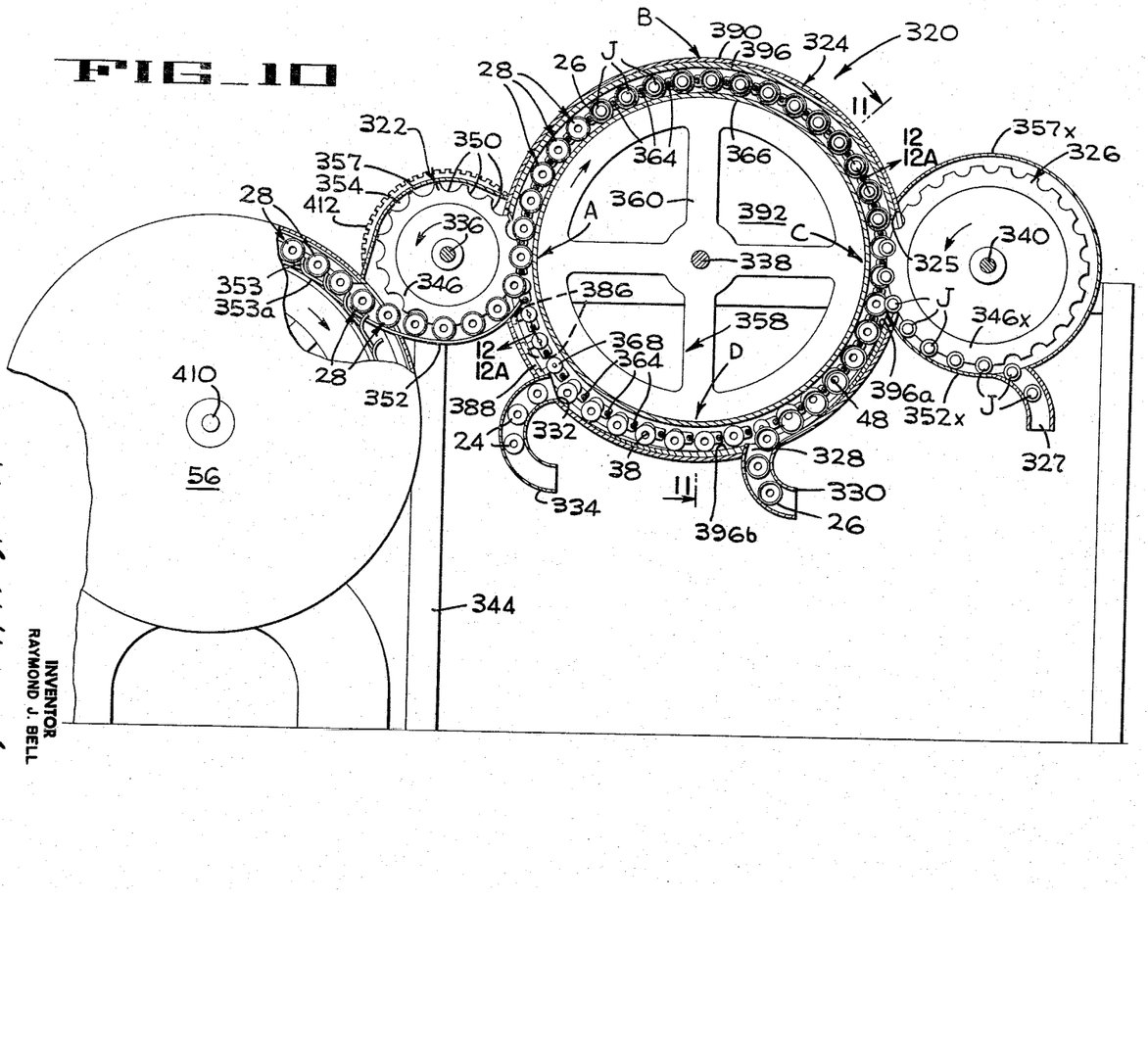
FIGURE 10 is an end elevation of the heat treatment apparatus showing the unloader in vertical section taken along lines 10—10 of FIGURE 9.

As best shown in FIGURE 10, the rods 364 serve as capsule advancing and controlling rods which space the capsules from each other and guide the cartridges 24 and carriers 26 when they are moved axially of the turret 324. Jar centering shafts 368 and 370 are secured to the wheels 360 and 362, respectively, between each pair of rods 364 and project inwardly toward each other. Associated pairs of the centering shafts 368 and 370 cooperate to center the jars transversely of the turret 324 so that the jars will be confined to movement in a central discharge path 372.

Figure 11:
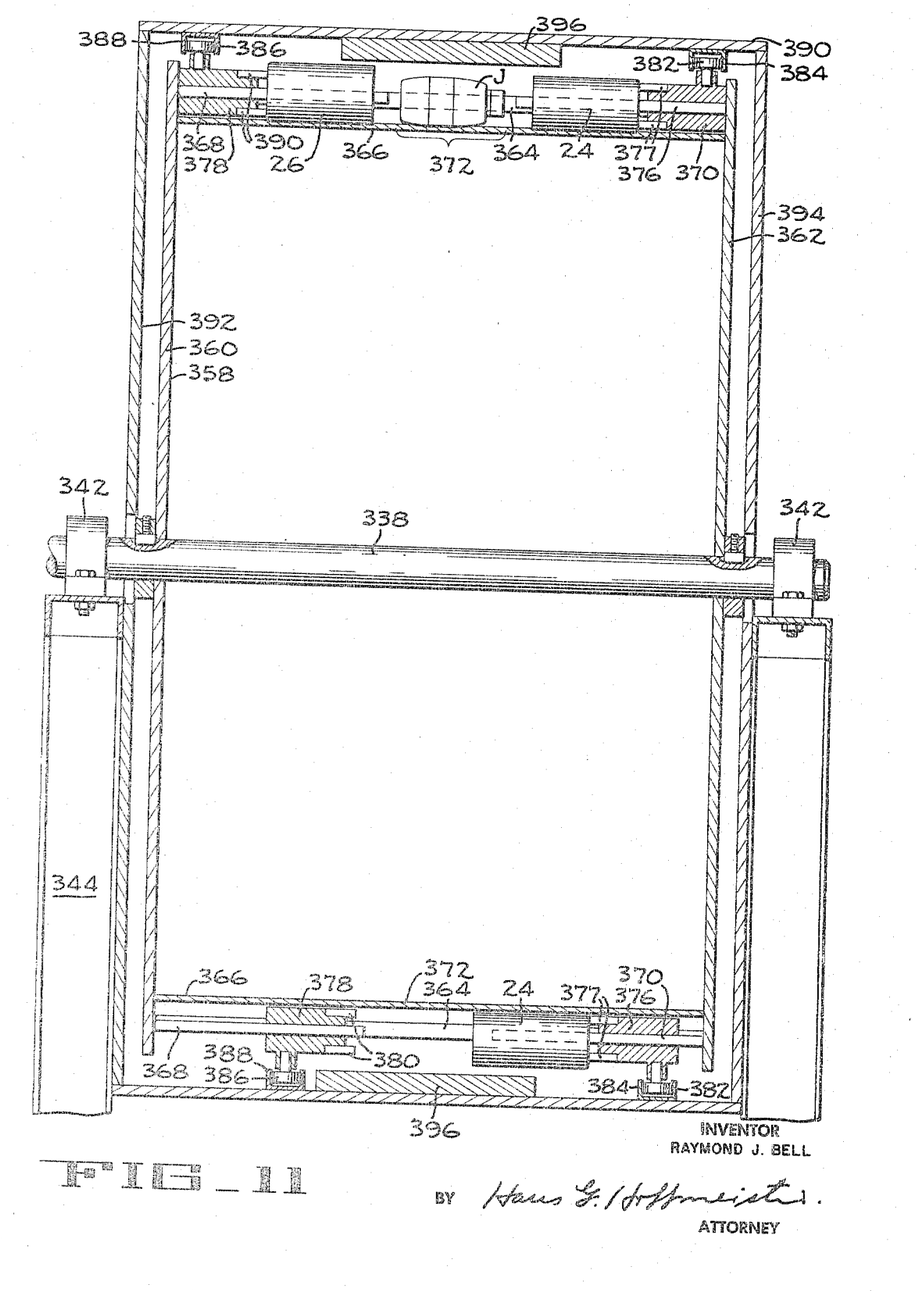
FIGURE 11 is an enlarged vertical section taken along lines 11—11 of FIGURE 10, certain parts being broken away.

Since the cartridges 24 and the carriers 26 have centrally disposed openings 38 and 48 (FIG. 3) in their end walls, it will be appreciated that the cartridges and carriers may be moved outwardly of the central path 372 over the centering shafts 368 and 370 to free the jars. As indicated in FIGURES 11, 12 and 12A, the centering shafts 370 and 368 will project into and partially support the cartridges 24 and carriers 26, respectively, as the cartridges and carriers are advanced around certain portions of the separating turret 324.

In order to control the movement of the cartridges 24 toward and away from the central path 372, a plurality of cartridge carriages 376 are provided, and each carriage 376 is slidably supported on one of the shafts 370 and an associated one of the rods 364. Magnets 377 are provided on the inner ends of each carriage 376 and, after being moved into contact with the associated cartridge 24, attracts the cartridge with sufficient force to pull the cartridge free from the jar upon outward movement of the carriage 376. Similarly, a plurality of carrier carriages 378 are slidably supported on cooperating ones of the rods 364 and associated centering shafts 368. Magnets 380 are secured to the inner ends of the carriages 378 and serve to engage and pull the carriers 26 free from the jars when the carriages 378 are moved from a position adjacent the central path 372 to a position away from the path.

A cam follower 382 is journalled on each cartridge carriage 376 and is slidably received in an endless channel cam track 384 so as to control transverse movement of the carriages 376. Similarly, each of the carrier carriages 378 has a cam follower 386 journalled thereon and slidably received in an endless cam track 388. The cam tracks 384 and 388 encompass the reel 358 and are held in fixed position by suitable means such as a multi-sectioned drum 390 which is secured, as by bolting, to spaced discs 392 and 394 of the frame 344.

Figure 12:
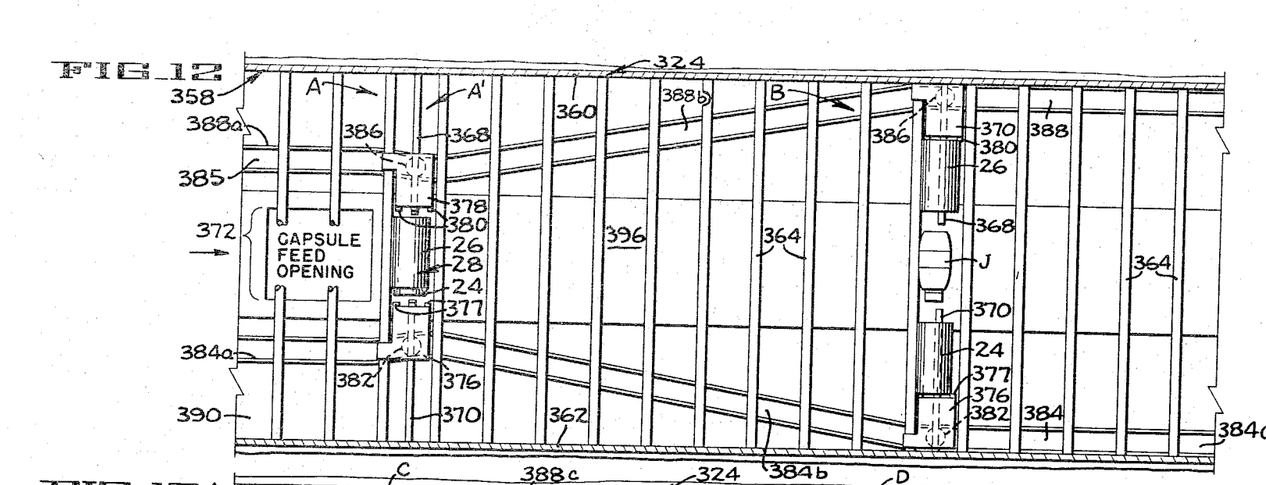
FIGURES 12 and 12A when combined define a drum layout indicating the manner in which the jar is separated from the cartridge and from the carrier, said layout being taken substantially along lines 12—12 and 12A—12A, respectively of FIGURE 10 with certain parts being removed.
Figure 12A:
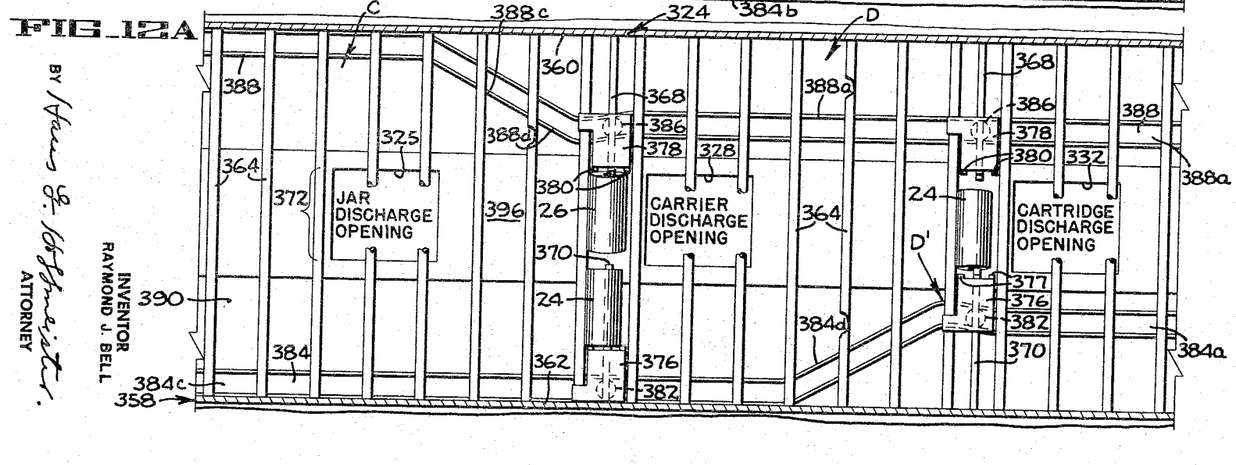

As best shown in FIGURES 12 and 12A which cooperate to define an expanded layout of the drum 390 and cam tracks 384 and 388, neutral portions 384a and 388a of the tracks 384 and 388 hold the magnets 377 and 380 on the carriages 376 and 378 slightly spaced from the capsules 28 as the capsules enter the separating turret 324 through the feed opening at point A. As the separating turret moves the capsules toward point B, the cam tracks 384 and 388 first jog the carriages toward each other at point A' so that the magnets 377 and 380 will contact and magnetically grip the cartridges and carriers, respectively. Thereafter, diverging track portions 384b and 388b move the cartridges and carriers away from each other so as to free the jars prior to reaching point C at which time the jars are swung through the jar discharge opening 325 by centrifugal force into the jar transfer turret 326 for subsequent discharge through the jar guides 327.

Shortly after the cartridges 24 and carriers 26 have moved past point C and past the discharge opening 325, a section 388c of the carrier track 388 angles sharply inward thereby moving the carriers 26 into the center path 372 and out of engagement with the associated centering shafts 368. The weight of each carrier 26 is sufficient to cause it to gravitate against a tapered portion 396a of an annular carrier supporting track 396 which track is secured to the inner surface of the drum 390. The tapered portion 396a of the track 396 is positioned between positions C and D as shown in FIGURE 10.

As the carriers are advanced along the track 396 by the rods 364, the openings 48 in the ends of the carriers 26 move out of alignment with the associated centering shafts 368. A section 388d of the cam track 388 then jogs outwardly to the neutral cam position 388a thereby moving the carriages 378 outwardly from the central path 372 causing the end walls of the carriers 26 to engage the ends of the associated centering shafts 368 thereby breaking the magnetic grip between the carriers 26 and the carriages 378 as the carriages move outwardly to their neutral positions. The freed carriers 26 then fall through the carrier discharge opening 328 and the curved guides 330 (FIG. 10) for discharge from the capsule unloader 320. The cam track 388 retains the carriages 378 in the neutral position until the carriages return to position A.

As shown in FIGURE 12A, the cartridge controlling track 384 includes an outer portion 384c which holds the cartridges 24 away from the central path 372 as the rods 364 move the cartridges from position C to approximately position D. Between positions D and the cartridge discharge opening 332, an inwardly inclined section 384d of the cam track 384 moves the carriages 376 inwardly thereby moving the cartridges 24 to the central path 372 and out of engagement with the centering shafts 370. The cartridges 24 then gravitate downwardly against a tapered cartridge track section 396b of the annular track 396 which section is secured to the drum 390 between positions D and A. Immediately prior to reaching the cartridge discharge opening 332, the cartridge cam track 384 jogs slightly outward at position D' to its neutral position thereby causing the carriages 376 to move outwardly of the centering shaft 368.

During this movement, the ends of the cartridges 24 engage the ends of the shafts 368 and thereby dislodge the cartridges from the magnets 377 on the carriages 376. The cartridges 24 then gravitate through the cartridge discharge opening 332 and curved guides 334 for discharge from the capsule unloader 320. The cam track 384 maintains the carriages 376 in their neutral positions until they are again returned to position A.

The turrets 322, 324 and 326 are all driven in timed relation from a large diameter gear 408 on the reel shaft 410 of the atmospheric cooler 56. The gear 408 meshes with a pinion 412 keyed to the shaft 336 of the capsule tranfer turret 322. The shaft 410 is connected by a chain drive 414 to the shaft 338 of the separating turret 324, and another chain drive 416 connects the shaft 338 to the shaft 340 of the jar transfer turret 326. Thus, the three turrets are driven in timed relation with the reel of the atmospheric preheater.

The curved jar guide 327, carrier guides 330 and cartridge guides 334 are of well-known designs and, if desired, may be constructed in a manner similar to the curved guides 220 (FIG. 5) of the first form of the capsule unloader.

From the foregoing description it is apparent that the two embodiments of the capsule unloader of the present invention each receive two-piece telescoping capsules and provide means for independently gripping the cartridge and carrier of the capsule to separate the cartridge from the carrier so as to free the jar, and to thereafter separately discharge the cartridge, the carrier and the jar. Magnets are used as the gripping means in both embodiments of the invention. The force of gravity prevents the jars from moving with the cartridge or carrier in the first embodiment of the invention while centering shafts prevent such movement in the second embodiment of the invention.

While two embodiments of the present invention have been shown and described, it will be understood that other changes and modifications may be made therein without departing from the spirit of the invention or the scope of the appended claims.

Having thus described the present invention and the manner in which the same is to be used, what is claimed as new and desired to be protected by Letters Patent is:

1. An apparatus for unloading an article from encapsulation within a two-piece capsule defined by a cartridge telescoped within a carrier comprising, means for continuously advancing the article along a predetermined path at a predetermined speed, means for moving said cartridge and said carrier transversely out of said path, means for continuously moving cartridge and said carrier at the same speed as the article during removal of the article from encapsulation, and means for separately discharging said cartridge, said carrier and said article.

2. An apparatus for unloading an article such as an elongated jar from encapsulation within a two-piece capsule defined by a cartridge telescoped within a carrier comprising, continuously driven means for advancing the capsule along a predetermined path, continuously driven means for withdrawing the carrier from around the cartridge, continuously driven means for inverting the cartridge and jar, continuously driven means for supporting the jar in upright position and moving the jar along a path, continuously driven means for gripping and lifting the cartridge from the jar while said jar is retained in an upright position on said jar supporting means, and means for separately discharging the cartridge, the carrier, and the jar.

3. An apparatus for unloading an article such as a jar from encapsulation within a two-piece capsule defined by a tubular cartridge having one end at least partially closed and its other end open and telescoped within a tubular carrier having one end at least partially closed comprising, continuously driven means for advancing said capsule along a predetermined path, means for magnetically attracting and transversely withdrawing said carrier from around said cartridge while moving along said path, means for magnetically attracting and transversely withdrawing said cartridge from said jar while moving along said path, and means for separately discharging said carrier, said jar, and said cartridge; said cartridge, said carrier, and the jar being continuously moved at the same speed during removal of the jar from encapsulation.

4. An apparatus for unloading an article such as a jar from encapsulation within a two-piece capsule defined by a first tubular member having one end partially closed and having a body portion telescoped within a second tubular member having one end partially closed comprising, continuously driven means for frictionally engaging one of said members for supporting the capsule, continuously driven means for gripping and moving the other member out of telescoped relation with said one member and said jar, continuously driven means for inverting said one member and the jar therein while said one member and jar are continuously moving, continuously driven means for supporting one end of the jar and continuously moving the jar after said one member and the jar have been inverted, and continuously driven means for separating said one member from the jar; said first tubular member, said jar, and said second tubular member all being continuously driven at the same speed during unloading of the jar from encapsulation.

5. An apparatus for moving an article such as a jar from encapsulation within a two-piece capsule defined by a first tubular member having one end partially closed and having a body portion telescoped within a second tubular member having one end partially closed comprising, a first continuously driven conveying means for supporting the capsule in an upright position on one end of one of said members, a second continuously driven conveying means for lifting the other member free from said one member and from the jar, continuously moving means for inverting said one member and jar therein, a third continuously driven conveying means for supporting one end of the jar after said one member and the jar have been inverted, and a fourth continuously driven conveying means for lifting said one member free from the jar.

6. An apparatus for unloading an article such as a jar from encapsulation within a two-piece capsule defined by a first tubular member having one end partially closed and having a body portion telescoped within a second tubular member having one end partially closed comprising, a first continuously driven conveying means for supporting the capsule in an upright position on the end of one of said tubular members, a second continuously driven conveying means for lifting said other tubular member free from said one member and the jar, magnetic means for causing said other member to cling to said second conveying means, continuously moving means for inverting said one tubular member and the jar therein, second magnetic means for causing said one tubular member to cling to said inverting means, third continuously moving conveying means for supporting one end of the jar after said one member and the jar have been inverted, a fourth continuously driven conveying means for lifting said one tubular member free from the jar, and third magnetic means for causing said one member to cling to said fourth conveying means.

7. An apparatus for unloading an article such as a jar from encapsulation within a two-piece capsule defined by a cartridge telescoped within a carrier comprising; an endless cartridge conveyor having an upper run with an inlet end, a curved portion, and a lower run inclined upwardly from said curved portion, said upper run being arranged to support the capsule in an upright position with the cartridge resting on said upper run; an endless carrier conveyor having an inlet end disposed immediately above said cartridge conveyor and having a first discharge end inclined upwardly therefrom; first gripping means associated with said carrier conveyor for attaching the carrier to said carrier conveyor when the carrier is moving between said inlet and said discharge end for lifting the carrier free from said upstanding cartridge and jar; means for withdrawing the carrier from said carrier conveyor at the discharge end thereof; second means associated with said cartridge conveyor for gripping the cartridge to said curved portion and to said lower run as the cartridge is moving around said curved portion and along said lower run; means for maintaining said jar in said cartridge as the cartridge is moved around said curved portion; means for withdrawing the cartridge from said cartridge conveyor at the discharge end thereof; a jar conveyor disposed below said lower run of said cartridge conveyor for supporting the jar on its end while said cartridge is lifted free from the jar; and means for driving said conveyors.

8. An apparatus according to claim 7 wherein said first and second gripping means are magnets which magnetically attract the carrier and cartridge, respectively.

9. An apparatus for unloading an article such as a jar from encapsulation within a two-piece capsule defined by a cartridge telescoped within a carrier and wherein both said cartridge and said carrier have inner ends open to receive the jar therethrough and have outer ends partially closed with central apertures therein comprising, a capsule supporting reel, a pair of elongated guide means secured to and extending transversely of said reel for receiving the capsule therebetween and for permitting transverse separation of the cartridge and carrier from the jar, a pair of aligned centering shafts secured to said reel and having free ends concentric with and spaced from the capsule to define a center discharge path therebetween, carrier gripping means supported by said reel for gripping said carrier and for moving the carrier between a position in said path and a position spaced from said path, cartridge gripping means supported by said reel for gripping said cartridge and for moving the cartridge between a position in said path and a position spaced from said path, means for rotating said reel to move said guide means between a capsule receiving position and a jar discharge position, and means for controlling the actuation of said carrier gripping means and said cartridge gripping means in timed relation with the movement of said reel whereby said gripping means move into gripping engagement with the carrier and cartridge immediately after said guide means receives the capsule and moves the carrier and cartridge out of said path before the jar reaches the jar discharge position.

10. An apparatus for unloading an article such as a jar from encapsulation within a two-piece capsule defined by a cartridge telescoped within a carrier and wherein both said cartridge and said carrier have inner ends open to receive the jar therethrough and have outer ends partially closed with central apertures therein, comprising a capsule supporting reel, a pair of elongated guide means secured and extending transversely of said reel for receiving the capsule therebetween and for permitting transverse separation of the cartridge and carrier from the jar, a pair of aligned centering shafts secured to said reel and having free ends concentric with and spaced from the capsule to define a center discharge path therebetween, a carrier carriage slidably received on one of said centering shafts for movement transversely of said reel, means on said carrier carriage for gripping said carrier, a cartridge carriage slidably received on the other of said centering shafts for movement transversely of said reel, means on said cartridge carrier for gripping said cartridge, means for moving said carriages into gripping engagement with said carrier and with said cartridge while said carrier and cartridge are in said central path and for thereafter pulling said carrier and cartridge out of said path and away from said jar, and means for rotating said reel to move said guide means between a capsule receiving position and the jar discharging position.

11. An apparatus for unloading an article such as a jar from encapsulation within a two-piece capsule defined by a cartridge telescoped within a carrier and wherein both said cartridge and said carrier having their ends open to receive the jar therethrough and having outer ends partially closed with central apertures therein; comprising a capsule supporting reel; a pair of elongated guide means secured to and extending transversely of said reel for receiving the capsule therebetween and for permitting transverse separation of the cartridge and carrier from the jar; a pair of aligned centering shafts secured to said reel and having free ends concentric with and spaced from the capsule to define a center discharge path therebetween; carrier gripping means supported by said reel for gripping said carrier and for moving the carrier between a position in said path and a position spaced from said path; cartridge gripping means supported by said reel for gripping said cartridge and for moving the cartridge between a position in said path and a position spaced from said path; a stationary curved guide around said reel and having openings therein defining a jar discharge opening, a carrier discharge opening, and a cartridge discharge opening; means for rotating said reel to move said guide means progressively between a capsule receiving position and positions opposite said jar discharge opening, said carrier discharge opening, and said cartridge discharge opening; and means for controlling the actuation of said carrier gripping means and of said cartridge gripping means in timed relation with the movement of said reel whereby said gripping means move into gripping engagement with the carrier and with the cartridge immediately after said guide means receiving the capsule and moves the carrier and the cartridge out of said path before the jar reaches the jar discharge position, said carrier gripping means then moving said carrier into said path for discharge from said carrier discharge opening and after discharge of said carrier said cartridge gripping means thereafter moving said cartridge into said path for discharge from said cartridge discharge opening.

12. An apparatus according to claim 9 wherein said control means comprises a first endless cam track operatively connected to said carrier gripping means, and a second endless cam track operatively connected to said cartridge gripping means.

13. Apparatus for unloading an article such as a jar from encapsulation within a container consisting of at least a body portion and a closure portion comprising means for continuously advancing said container and encapsulated jar along a predetermined path at a constant speed, means for magnetically attracting said withdrawing said closure member from said body portion and jar while said container is continuously moving along said path, means for magnetically attracting and withdrawing said body portion from said jar while continuously moving along said path, and means for separately discharging said closure, said jar and said body portion; said closure, said jar, and said body portion being moved continuously at the same speed during removal of the jar from encapsulation.

References Cited by the Examiner

UNITED STATES PATENTS

| | | | |
|---|---|---|---|
| 774,378 | 11/1904 | Carter | 53—381 X |
| 2,668,002 | 2/1954 | Temple | 53—381 |
| 2,886,195 | 5/1959 | Stadelman | 214—304 X |
| 2,990,073 | 6/1961 | Textor | 53—381 X |

HUGO O. SCHULZ, *Primary Examiner.*